(12) United States Patent
Gennaro et al.

(10) Patent No.: US 8,292,982 B2
(45) Date of Patent: Oct. 23, 2012

(54) PROCESS FOR PRODUCING A FILTER, IN PARTICULAR FOR A ROTARY SEPARATOR

(75) Inventors: Paolo Gennaro, Cameri (IT); Maurizio Romeo, Cameri (IT); Giuseppe Bene, Turin (IT); Franco Tortarolo, Turin (IT); Giovanni Paolo Zanon, Rivalta di Torino (IT)

(73) Assignee: Avio S.p.A., Turin (IT)

( * ) Notice: Subject to any disclaimer, the term of this patent is extended or adjusted under 35 U.S.C. 154(b) by 394 days.

(21) Appl. No.: 12/591,800

(22) Filed: Dec. 1, 2009

(65) Prior Publication Data

US 2011/0127213 A1 Jun. 2, 2011

(51) Int. Cl.
*B01D 46/18* (2006.01)

(52) U.S. Cl. ......... 55/400; 55/523; 55/DIG. 5; 210/506; 427/532; 427/551; 264/1.37; 264/125; 264/653; 264/666

(58) Field of Classification Search ..................... 55/400, 55/523, DIG. 5; 210/506; 427/532, 551; 264/1.37, 125, 653, 666
See application file for complete search history.

(56) References Cited

U.S. PATENT DOCUMENTS

| | | | |
|---|---|---|---|
| 6,112,804 A | 9/2000 | Sachs et al. | |
| 7,963,402 B2 * | 6/2011 | Juma | 210/508 |

FOREIGN PATENT DOCUMENTS

| | | |
|---|---|---|
| DE | 10 2005 032842 | 1/2007 |
| EP | 1 878 522 | 1/2008 |
| WO | WO 01/14127 | 3/2001 |

OTHER PUBLICATIONS

Yadroitsev et al., "Manufacturing of fine-structured 3D porous filter elements by selective laser melting", Applied Surface Science, Journal Homepage: www.elsevier.com/locate/apsuse, 2009, pp. 5523-5527.
Sapozhnikov et al., "Effect of production factors on the properties of porous filtering tubes formed from titanium powders", *Chemical and Petroleum Engineering*, Jan. 1990, vol. 25, No. 5-6, pp. 361-364, XP002527555.
European Search Report for EP 08425566 Dated Jun. 24, 2009.

* cited by examiner

*Primary Examiner* — Jason M Greene
*Assistant Examiner* — Dung H Bui
(74) *Attorney, Agent, or Firm* — Nixon & Vanderhye P.C.

(57) ABSTRACT

A filter, in particular for a rotary separator, is produced using an energy beam melting process, for example an electron beam, starting from powder made from the same material as a porous filtering portion to be formed, for example from a titanium alloy; on the basis of a three-dimensional model comprising a cell structure defining the porous filtering portion, subsequent layers of powder are applied and locally melted, so as to form successive sections of the porous filtering portion; at the end of the forming process, the residual powder is evacuated from the pores.

19 Claims, 6 Drawing Sheets

PROCESS FOR PRODUCING A FILTER, IN PARTICULAR FOR A ROTARY SEPARATOR

The present invention relates to a process for producing a filter, in particular for a rotary air/oil separator in a turbine engine.

BACKGROUND OF THE INVENTION

As is known, turbine engines in aeronautical applications have an air/oil separator comprising a toroidal-shaped filter, which is mounted on a rotor and is defined by a series of ring-shaped filter elements, made from a metal foam. The filter receives an incoming mixture of air and oil on one of its faces and allows the air to pass through, trapping the oil particles in the pores in the metal foam. Due to the effect of the rotation of the rotor the oil is made to pass radially through the pores, before being discharged and flowing out towards a tank.

The production of filter elements made from nickel-chrome or nickel alloys is known, using a matrix that consists of spheres of polymeric material, the positions and dimensions of which correspond to those that the pores in the metal foam will have. The porous structure is obtained by laying the metal alloy (for instance using electro-chemical means) in the spaces between the spheres and subsequently eliminating the polymeric material.

According to a different process, the production of filter elements made from an aluminium alloy is known. In this case, the pores in the metal foam are obtained by blowing gas into the alloy while the latter is still in the liquid state.

The filter elements obtained using the known methods described above are not entirely satisfactory, in that the centrifugal inertia forces exerted on the filter due to the rotation of the rotor are not balanced. With the known production methods the metal material is not distributed in a perfectly uniform manner in the volume of the filter elements.

In particular for processes using a polymeric matrix, this problem is due to the fact that the position of the pores is determined by the position of the spheres in the polymeric material, which is in turn not entirely controllable and thus has a certain degree of randomness.

Even slight non-uniformities in the distribution of the material and, thus, slight deviations of the centre of gravity of the filter with respect to the axis of the rotor cause problems in terms of inertia forces, as the rotor turns at high speeds (up to approx. 18,000 rpm).

Moreover, also due to the randomness of the position of the pores, the various filter elements are not perfectly identical to one another, which means that different air/oil separators might behave slightly differently in turbine engines, at the same speed of rotation.

SUMMARY OF THE INVENTION

The purpose of the present invention is to provide a process for producing a filter, in particular for a rotary separator, which overcomes the drawbacks described above in a simple and cost-effective manner.

According to the present invention a process is provided for producing a filter; the process comprising the steps of:
a) forming a three-dimensional mathematical model, which comprises a cell structure defining a filtering porous portion of said filter and has cells corresponding to respective pores to be obtained in said porous portion;
b) applying powder having the same composition as said porous portion and having a grain size lower than a porosity to be obtained, in order to define a horizontal layer of powder having a substantially constant thickness;
c) locally melting the powder of said layer by means of energy beam scanning in order to form a section of said porous portion according to a level of said three-dimensional model;
d) lowering the upper surface of the formed section to a predefined position;
e) repeating the steps from b) to d) until all the sections of said porous portion have been formed;
f) eliminating the residual powder from the pores of the formed porous portion.

BRIEF DESCRIPTION OF THE DRAWINGS

In order to better understand the present invention, a non-limiting preferred embodiment thereof will now be described by way of example with reference to the accompanying drawings, in which.

DETAILED DESCRIPTION OF THE INVENTION

Figures 1, 2:
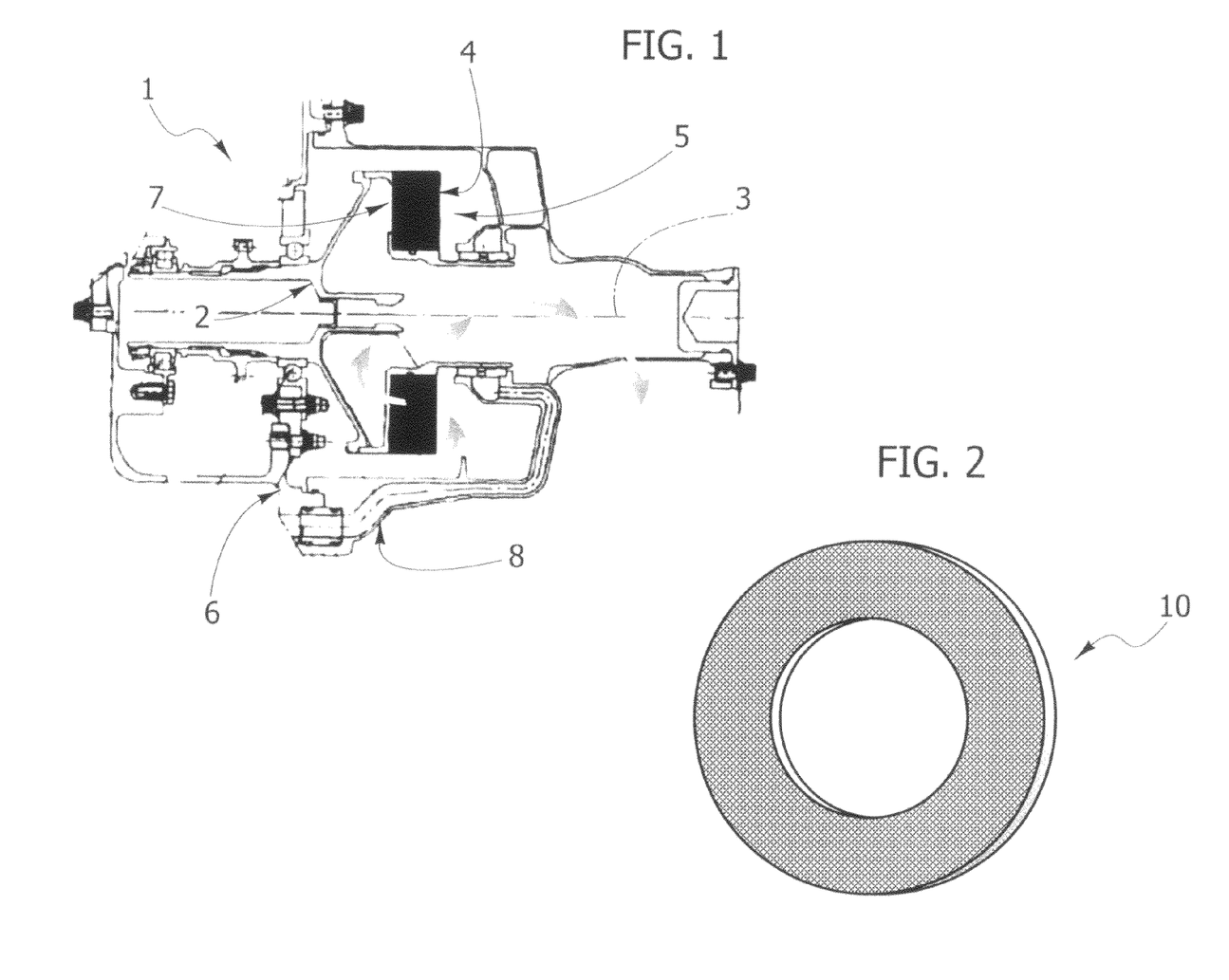
FIG. 1 is a schematic cross-sectional view of a rotary air/oil separator in a turbine engine, comprising a filter produced according to a preferred embodiment of the process according to the present invention.
FIG. 2 shows a filter element forming part of the filter of FIG. 1.

In FIG. 1, number 1 indicates a rotary air/oil separator in a turbine engine. The separator 1 comprises a rotor 2, which rotates about an axis 3 and carries, in a fixed and coaxial position, a toroidal-shaped filter 4. The filter 4 has an axial face 5 that receives a mixture of air and oil arriving from an inlet 6, and allows the air to pass through towards the opposite axial face 7. From here, the air flows to an outlet to be discharged off-board. The oil is trapped in the pores of the filter 4 and, due to the centrifugal inertia forces, flows radially until leaving the filter 4, after which it is collected and flows out through an outlet 8 of the separator 1 to a tank (not illustrated).

The filter 4 comprises a plurality of coaxial and overlapping rings 10, one of which is illustrated in FIG. 2. The filter 4 also comprises a plurality of drive pins (not illustrated), which protrude from the faces 7 and 8, engage, in fixed positions, respective seats obtained in the rings 10 and are made from solid metal material (i.e. with no pores).

With reference to FIG. 2, the rings 10 are defined by a metal foam made from a titanium alloy, preferably from an alloy known as Ti6-4 Ti-6Al-4V (with an aluminium content of 6% and a vanadium content of 4%). Said alloy is a material compatible with the temperatures that are present, in use, in the separator (approx. 150° C.) and with the temperatures used in processing the other components that are part of the separator 1 (approx. 750° C.); it has no problems with corrosion by nitric acid, the agent that is normally used for cleaning the filters in the current processes for producing air/oil separators for aeronautical turbine engines; it has no difficulty with use in environments with oil and/or kerosene; and it has a lower density compared to the known nickel-chrome alloy solutions, (4.43-4.67 kg/dm$^3$ instead of 7.8-8.11 kg/dm$^3$) and higher resistance to fracture or UTS (ultimate tensile strength) values.

In particular, the high specific resistance values, defined as the ratio between UTS and density, of the material used (approx. 200 kNm/kg for Ti6-4) mean filtering can be optimized with respect to the known solutions in nickel-chrome alloys (which have specific resistance values ranging from approx. 50 to 150 kNm/kg) or aluminium alloys, even at low turbine engine speeds.

Using a higher speed ratio, to make the rotor 2 turn faster with respect to the known solutions, at higher turbine engine speeds there is no risk of the filter 4 exploding due to the centrifugal inertia forces, thanks to the higher specific resistance of the titanium alloy; while at lower turbine engine speeds the centrifugal inertia forces exerted on the oil in the rotor 2 are greater and achieve better performance in terms of separation from the air.

Any titanium alloy could be used to obtain the same results. In particular, the Ti6-4 alloy mentioned above is advantageous, in that it is readily available on the market.

Some steps of the process for producing the filter 4 are illustrated in FIGS. 3A-3D, where, for the sake of clarity, the forming of a single ring 10 is illustrated, with views that are not to scale. However, in actual series production, a plurality of rings 10 can be formed simultaneously, or a filter comprising a single ring 10 (such as that of the alternative embodiment of FIG. 6, which is described more fully later on).

The ring 10 is made by means of a layer-by-layer production techniques, using an energy beam melting process, for example a focussed electron beam or a focussed laser beam, to perform localized melting of subsequent layers of powder having the same composition as the end product to be obtained. These processes are known for example as direct laser forming (DLF), laser engineered net shaping (LENS), selective laser melting (SLM), or electron beam melting (EBM).

The process is performed using a machine 11 comprising a melting chamber 12, which houses a starting platform 13 and a powder dispenser 14. The machine 11 also comprises a source or gun 15 to emit the energy beam: the source 15 is activated and controlled by a control unit 16 in order to melt the powder locally in correspondence with the actual zones to be formed. To protect the material being melted against oxidation, the machine 11 also comprises a system (not illustrated) for generating the vacuum in the melting chamber 12, or for directing a jet of inert gas (for example argon) onto the area being melted.

In particular, an electron beam melting machine, or EBM, is used under forced vacuum to produce the ring 10. For instance, a suitable machine is the EBM A2 manufactured and distributed by ARCAM AB (Sweden).

Figure 3A:
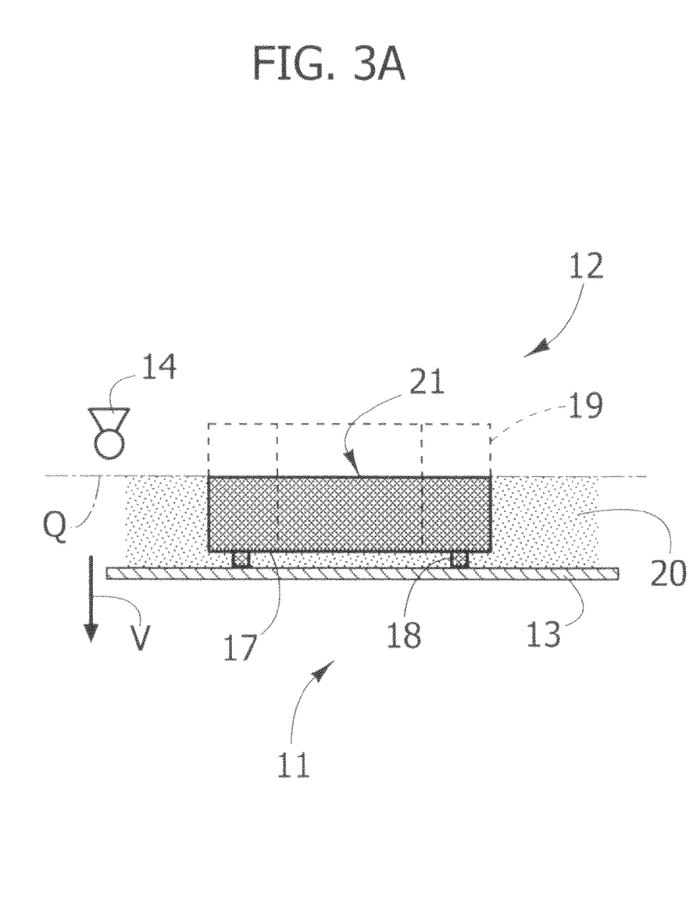
FIGS. 3A-3D schematically illustrate some steps in the process for producing the filter.

The starting platform 13 is operated in a way that is not illustrated so as to translate, in response to commands sent by the control unit 16, in the vertical direction indicated by the arrow V. The starting platform 13 is made from a material capable of withstanding the high temperatures used for melting the titanium alloys, for example a nickel-based alloy marketed under the brand name of Inconel (registered trademark) having a melting temperature of approx. 1340° C.

The process according to the present invention comprises the step of forming a three-dimensional mathematical cell model, corresponding to the form, dimensions and desired internal structure for the ring 10, as described more fully later on. The three-dimensional model of the ring 10 can be formed using a computer-aided design program (CAD) and transferred in the form of a file to the control unit 16.

The three-dimensional model is stored in the control unit 16 and split into parallel overlapping levels, each associated with a relative cross section to be formed by locally melting the powder of a layer applied by the dispenser 14.

FIG. 3A shows an intermediate step in the production of the filter 4. In this step, some portions of the part are assumed to have already been made, in particular a lower annular portion 17 of the ring 10 and a series of pedestals 18, which are all of the same height and spaced from one another about the vertical axis of the portion 17. The pedestals 18 are produced with the same porous structure as the ring 10, and, in particular, they are cylinders with a 3 mm diameter, integral with the ring 10. The pedestals 18 have already been defined with the ring 10 in the three-dimensional model and are also made in the machine 11. The first cross section that is formed in the machine 11 defines the lower surface of the pedestals 18 and is fixed to the starting platform 13 as a consequence of the melting process, so that on the one hand the pedestals 18 keep the ring 10 attached to the starting platform 13 during the forming process, and on the other they separate the portion 17 from the starting platform 13.

A remaining upper portion 19 that has yet to be formed is shown by the dashed line in FIGS. 3A-3D. The formed portions 17, 18 are surrounded by a mass of powder 20 that has previously been applied in layers but not melted.

As mentioned above, the powder has the same composition as the material from which the articles are to be made. The powder can have a grain size of between 20 and 150 μm. In particular, the powder has a controlled grain size of between 45 and 65 μm. This choice of powder grain size represents the best compromise between the need for high-speed production (in which powder with larger grains would be preferable), and for a good level of precision and uniformity in the filiform portions of metal material, the so-called "filament", in the porous structure being produced, besides enabling the residual powder to be removed easily from the porous structure at the end of the forming process.

The powder that is used is preferably obtained using a gas atomization process, that is a process capable of forming grains with a substantially spherical shape.

Figure 3B:
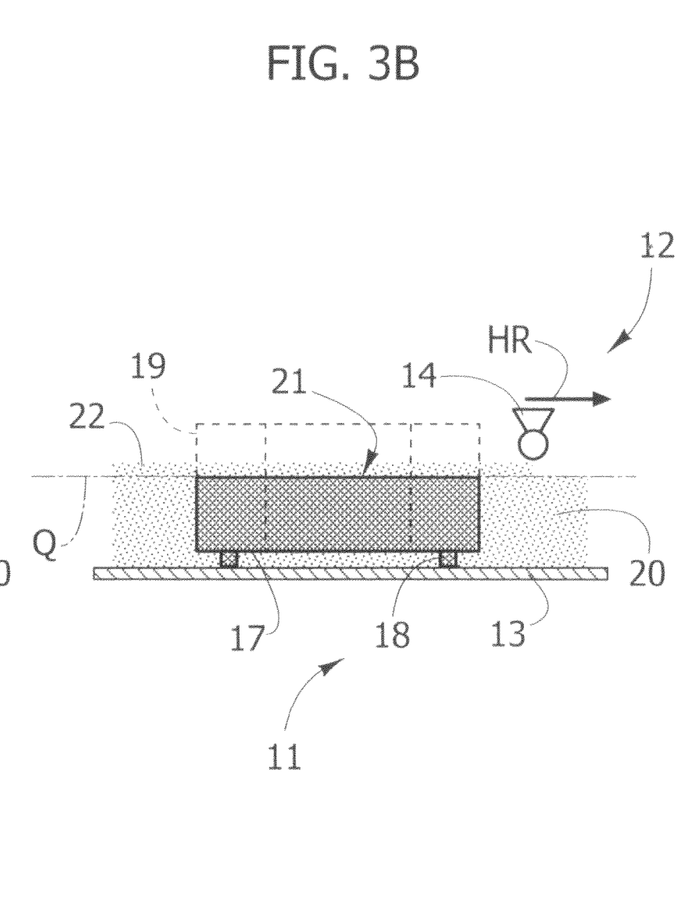
Figure 3C:
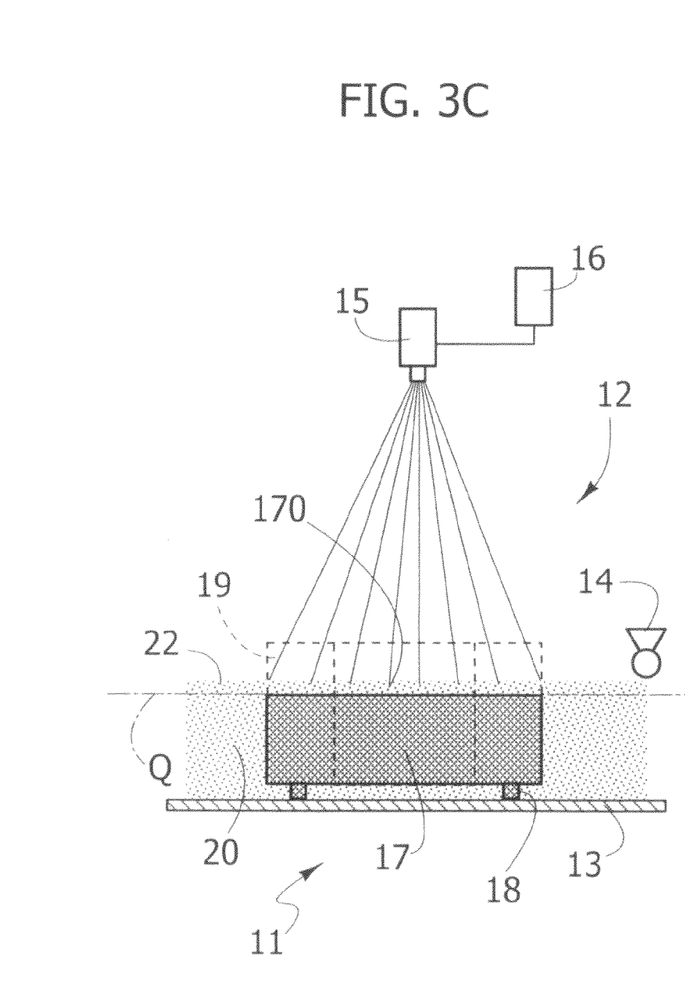

As illustrated in FIG. 3B, the upper surface 21 of the portion 17 and of the surrounding powder 20 is arranged at a fixed reference position (line Q) with respect to the dispenser 14. The dispenser 14 moves horizontally (arrow HR) and applies a layer 22 of powder having a substantially uniform thickness (purposely exaggerated in the drawing for the sake of clarity) on the surface 21. In the specific case, the layer 22 is 70 μm thick (generally speaking, electron beams can be used for layers with a thickness of between 70 and 100 μm, while laser beams are used for layers with a thickness of between 20 and 40 μm).

The powder of the layer 22 undergoes a pre-heating process in which it is heated to a temperature that is lower than the melting temperature of the titanium alloy being used, for example to a temperature of approx. 800° C. For example, the pre-heating step is performed using the focussed energy beam only.

Alternatively, the pre-heating step is performed by heating the melting chamber 12 using electric resistors (not illustrated), arranged outside the melting chamber 12; or combining heating by resistors and the heat generated by the focussed energy beam.

After pre-heating (FIG. 3C), the source 15 is activated to melt the powder of the layer 22 in localized zones selected by the control unit 16 on the basis of information relating to the level of the three-dimensional model corresponding to the cross section to be formed.

As regards titanium alloys, the temperature required to melt the powder in the chamber 12 is generally not less than approx. 1700° C. and can reach 1800° C. as a function of the particular alloy that is used.

During the pre-heating step and during the melting step, the energy transmitted by the electron beam to the powder is controlled to obtain the desired temperature. This can be done in different ways: by changing the number of passes by the electron beam on the layer of powder, to vary exposure time; by "blurring" the electron beam (loss of energy per surface unit); by varying the supply current of the source 15; by varying the energy beam scanning speed; by emitting the energy beam intermittently; or by any combination of these methods.

Preferably, the temperature inside the melting chamber 12 is constantly kept under control, for example using a thermocouple (not illustrated) arranged beneath the starting platform 13 and extrapolating the temperature of the powder in the chamber 12 according to the data relating to the thermal capacity of the materials and the growing mass of powder in the chamber 12. The energy transmitted to the powder by the electron beam can be adjusted in a closed loop manner during the steps of the forming process, as a function of the temperature reading.

As regards the melting step, at the beginning the focussed electron beam is preferably guided along the perimeter of the area corresponding to the cross section to be formed. The focussed electron beam is then guided along a scanning path that covers all the remaining internal area of the cross section to be formed. In particular, for each cross section to be formed, the focussed electron beam follows a scanning path consisting of parallel sections that are transversal, for example with an angle of between 60 and 90 degrees, with respect to the sections of the scanning path with which the previous melting step was performed, i.e. of the underlying cross section.

Figure 3D:
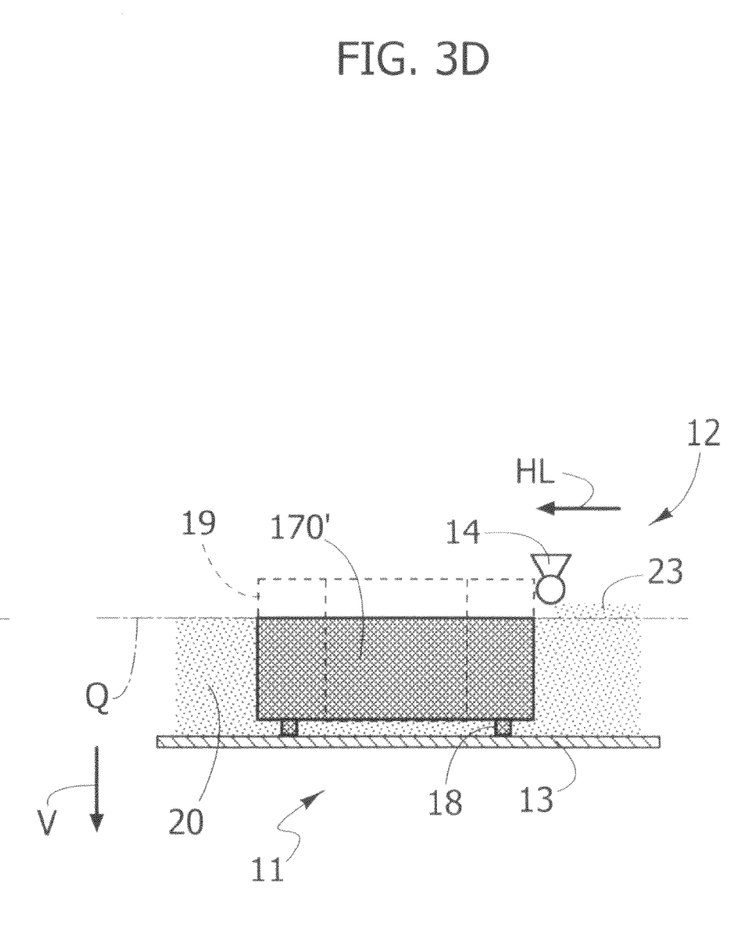

With this step a new cross section 170 is thus formed above the portion 17. During the powder melting process, the cross section 170 is "amalgamated" with the underlying portion 17 to form a new portion 170' (FIG. 3D).

The thickness of the formed cross section 170 is only a function of the thickness of the layer of powder applied by the dispenser 14.

After the melting step, the staring platform 13 is lowered by a previously defined amount (arrow V) substantially corresponding to the thickness of the newly formed cross section 170, so that the upper surface of the portion 170' and of the surrounding powder is brought to the fixed reference position (line Q).

The dispenser 14 then starts again in the opposite direction to apply a new layer 23 of powder that is then subject to localized melting. The process continues in this way, repeating the steps of applying a layer of powder, pre-heating, melting and lowering of the starting platform 13, until reaching the last level of the three-dimensional model stored in the control unit 16, i.e. until the missing portion 19 is complete.

At the end of the forming process, a cooling process is advantageously performed using a flow of inert gas, for example helium or mixtures thereof, introduced into the melting chamber 12 at a pre-defined pressure (for example approx. 2 bar), and for a sufficient length of time in order to reach a temperature at which the ring 10 can be removed manually from the chamber 12.

Figure 4:
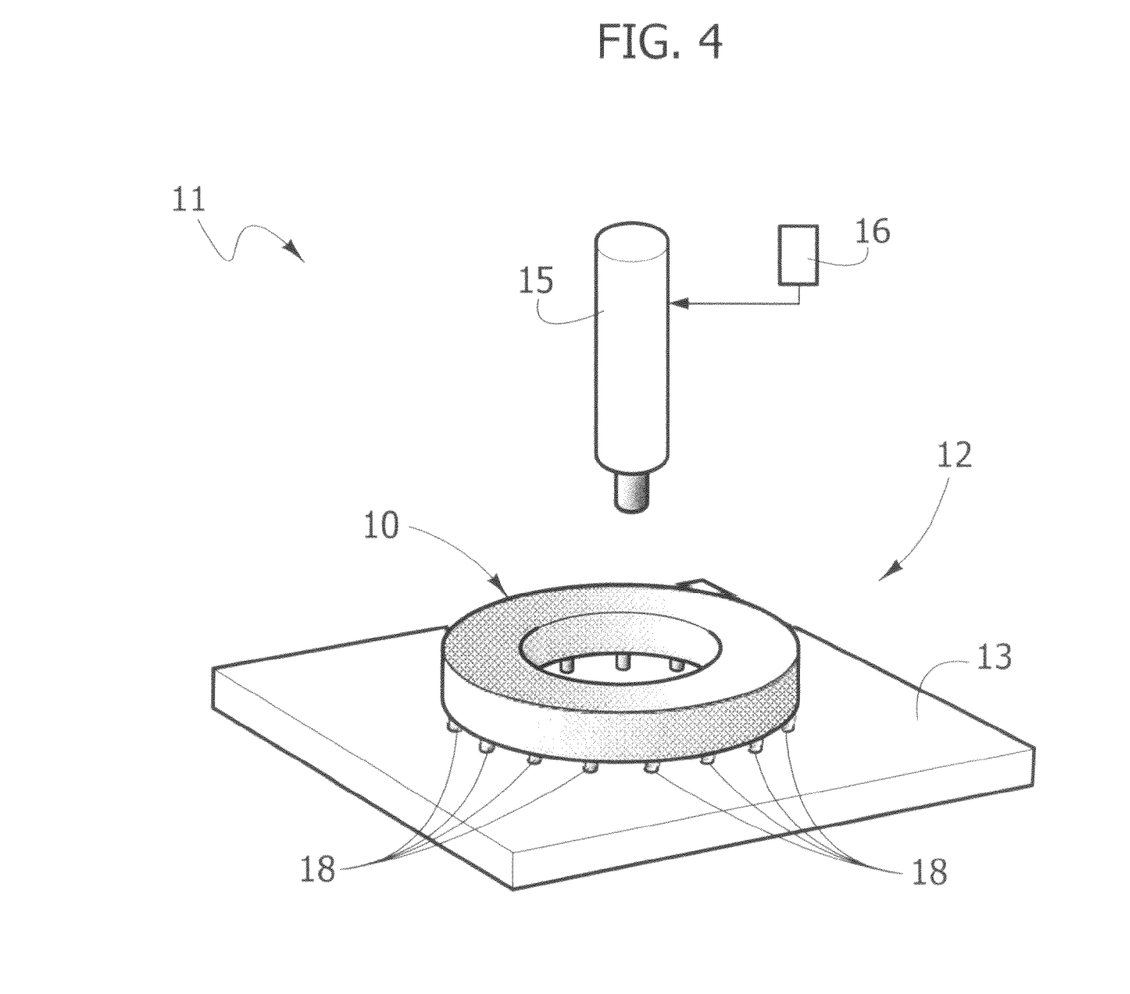
FIG. 4 is a schematic perspective view of a further step of the process for producing the filter.

After removing the remaining surrounding powder, the ring 10 is separated from the starting platform 13 (FIG. 4): the formed part breaks along the pedestals 18, due to their fragility, without undermining the integrity of the ring 10.

The ring 10 then undergoes a sandblasting process, in a different machine, to evacuate any residual powder that has accumulated in the pores. Sandblasting is performed using powder with the same composition and grain size as that used to form the ring 10 and which has accumulated in the pores, so that the powder used for sandblasting and that freed from the pores can be recycled together.

If necessary, the ring 10 undergoes a mechanical finishing process, for example to eliminate any traces of the pedestals 18.

The filter 4 is then assembled by axially overlapping the various rings 10 that make it up and arranging them in a retainer (not illustrated), and is drilled to obtain the seats for the drive pins described above. Said drive pins, are then inserted into the corresponding seats and fastened in place, for example by means of a riveting process.

Figure 5:
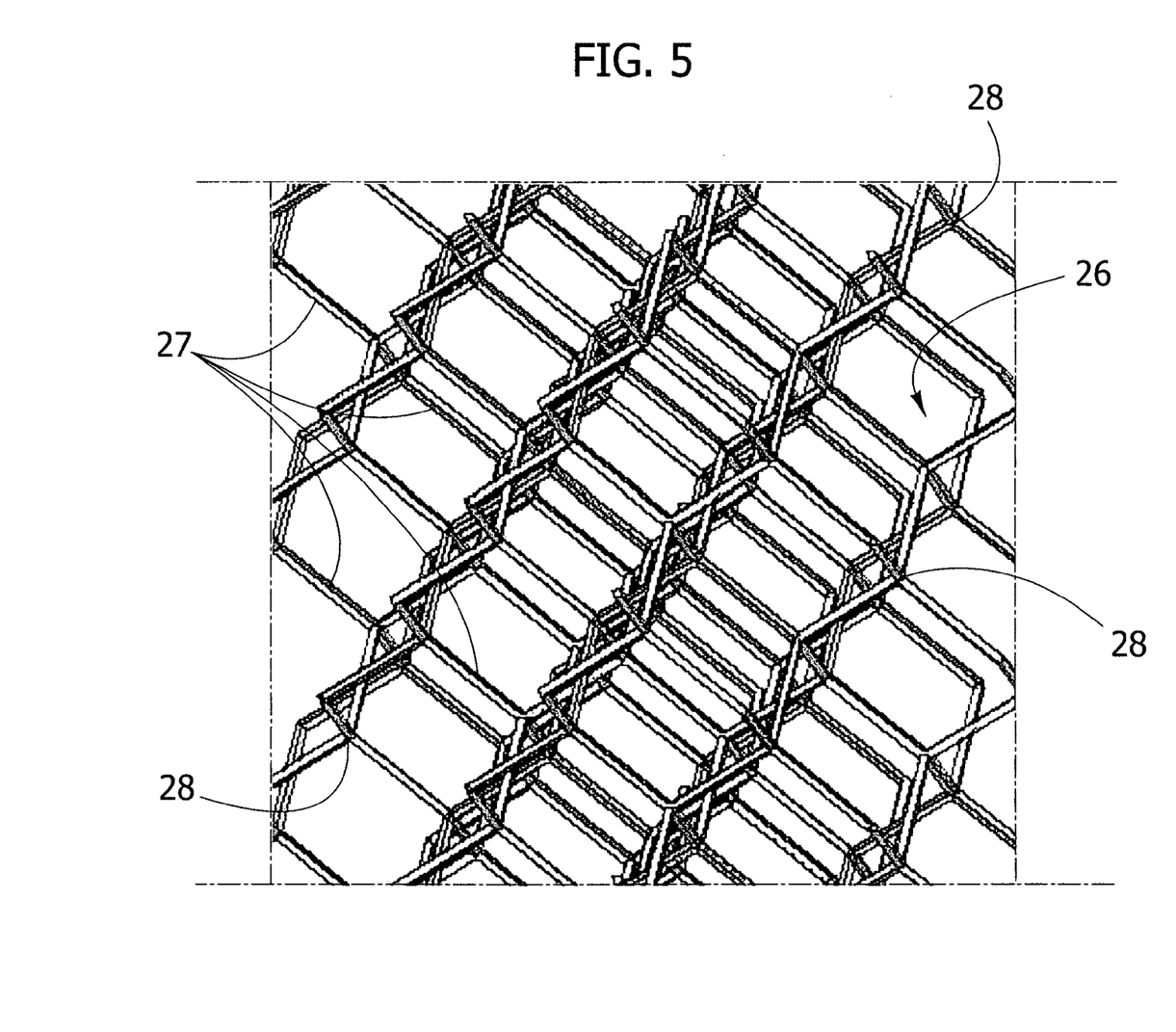
FIG. 5 is a schematic illustration on an enlarged scale of a cell structure of a mathematical model of the porous structure of the filter.

With reference to FIG. 5, to define the internal structure of the ring 10, i.e. the distribution of the pores and of the metal material of which the ring 10 is made, a three-dimensional cell model is formed. Said three-dimensional model is formed by defining a basic module, which represents a portion of the porous structure of the ring 10, and repeating the basic module in exactly the same way until obtaining the shape and dimensions that correspond, in the three-dimensional model, to those of the ring 10 and the pedestals 18.

The cells 26 of the three-dimensional model substantially correspond to the pores obtained at the end of the forming process of the ring 10. By using the three-dimensional model to define the structure, the pores can be distributed uniformly about the axis of the ring 10. By repeating the basic module, the dimensions and shape of the pores are substantially identical throughout the entire ring 10.

In the three-dimensional model, the cells 26 are defined by rectilinear portions 27 that correspond to filiform portions of metal material, the so-called "filament", in the porous structure to be produced.

Regardless of the shape of the cells 26, the three-dimensional model and/or melting parameters are set to achieve a porosity (meaning the average diameter of ideal spheres inscribed in the pores) so as to achieve the desired compromise between the following requirements, as a function of the specific application: good filtering properties; the need to avoid excessively high counterpressure (for example to avoid counterpressure, on inlet 6, that would result in the sumps of the ball bearings of the turbine engine becoming clogged); the need to facilitate evacuation of residual powder from the pores at the end of the forming process. As the pores are essentially defined by respective cells of the mathematical model, and not by gaps among the powder grains, it is evident that the porosity should be much higher than the grain size. In particular, porosity ranges from between 500 μm and 1500 μm. For example, a value of 560 μm is preferable in order to optimize filtering efficiency.

At the same time, with the aim of producing a relatively light filter 4, the three-dimensional model and/or melting parameters are set to obtain a metal foam in which the ratio between the pore volume and the total volume of the structure is at least 84%.

Using the cell structure illustrated in FIG. 5, referred to as a diamond or honeycomb structure, in the three-dimensional model the thickness of the "filament" (portions 27) is set for example to 0.1 mm, and the distance between two opposing vertices 28 of the cell 26 to between 0.5 and 1 mm.

The electron beam meets the surface of the powder in a circular area having a diameter greater than the thickness of the "filament" as set using the CAD system, but by setting suitable melting parameters the ARCAM machine that is used is able to modulate the energy transferred to the powder in order to approximately obtain a "filament" thickness that is relatively close to the set value.

For example, for the melting process the electron beam scanning speed is set to 180 mm/s, and the current supply of the source 15 is set to 1.5 mA (which then determines the power of the electron beam, as the source 15 is powered by a fixed voltage, of 60,000 V).

Another parameter, referred to as the offset parameter, can also be set in the ARCAM machine that is used. Generally speaking, this parameter indicates the distance in millimetres between adjacent parallel sections of the scanning path of the electron beam, but in the specific case of a three-dimensional cell model, it allows the effective thickness of the "filament" in the porous structure of the ring 10 to be adjusted, within certain limits, in relation to that indicated in the three-dimensional model. For example, with a "filament" thickness of 0.1 mm set in the CAD file and with the offset parameter set to 0.049 mm the metal foam that is obtained has substantially the void/solid ratio stored in the CAD file; if the offset parameter is set to 0.035 mm this ratio is increased by 4%, with the subsequent advantageous reduction in the end weight of the filter. In this way, however, porosity is also slightly increased with respect to the value in the three-dimensional cell model.

Figure 6:
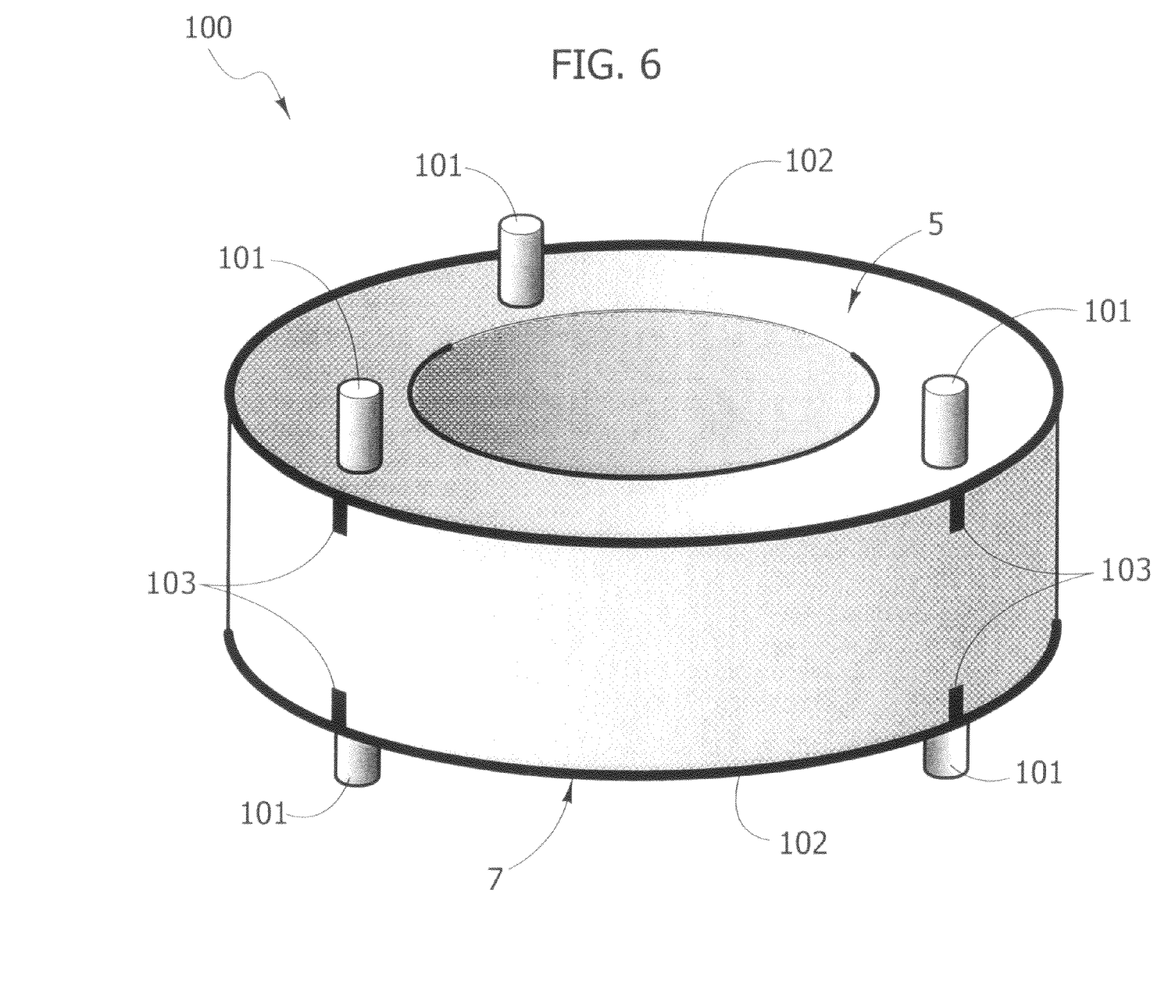
FIG. 6 is a schematic illustration of an alternative embodiment of the filter of FIG. 2.

According to the alternative embodiment illustrated in FIG. 6, the filter 4 comprises a single ring 100 defined by a metal foam similar to that of the filter ring 10; and a plurality of drive portions 101 that replace the drive pins, protrude from the axial faces of the ring 100 and are incorporated in the ring 100, i.e. they are also defined in the three-dimensional model and are formed in the melting chamber 12, but made from a solid and not porous material.

In combination with or as an alternative to the portions 101, the filter 4 comprises two circular reinforcement rings 102 arranged along the edges of the ring 100 and/or, for each drive portion 101, a relative reference portion 103, or tag, arranged on the external cylindrical surface of the ring 100. In particular, the rings 102 and the tags 103 are also defined in the three-dimensional model and are formed in the melting chamber 12 with the ring 100, but made from a solid and not porous material.

The advantages of obtaining filters using the present process are now described.

The filter 4, and, thus, the rotor 2 are balanced and light and, at the same time, filtering efficiency is achieved thanks to the fact that the porous structure is set as desired and pre-defined using a three-dimensional cell model. In other words, the structure and thus the properties of the filter can be defined at the design stage in order to meet the required specifications and produce the structure and technical characteristics with the utmost precision. In particular, it is possible to implement filters with axially symmetrical geometries and a filtering power that varies gradually, without any break in the continuity of said filters.

The filters 4 produced using a same three-dimensional model and with the same melting parameter settings, have a porous structure and qualities that are constant with the same mechanical properties, regardless of the complexity of the shape of the filters.

Moreover, the process is extremely flexible, in that the internal porous structure and/or the shape and the external dimensions can be altered simply, by replacing the three-dimensional model.

By using an electron beam, instead of a laser beam, it is possible to increase the roughness of the metal material in the pores and thus the efficiency of trapping oil droplets. The electron beam is actually less accurate than the laser, in that it is more powerful, it is less focussed than the laser, and is used for thicker layers of powder (with a greater melted mass): in practice, it also melts some grains of powder in the area immediately surrounding the required area and thus increases final surface roughness. Increased roughness means a larger contact surface, and thus a larger surface on which the oil can be deposited, compared to an almost perfectly smooth surface obtained using laser technology.

Electron beam technology also cuts production times compared to laser technology and processing can be performed at higher temperatures.

As mentioned above, the pedestals 18 keep the ring fixed to the starting platform 13 during melting, thus preventing any swelling which would be apparent on the surfaces subjected to the melting process if the ring 10 was simply resting on a layer of powder.

The fact that the pedestals 18 are formed with the same porous structure as the ring 10 guarantees the continuity of the material between the ring 10 and the starting platform 13 to ensure correct anchorage.

At the same time, the pedestals 18 are fragile due to their porous structure and reduced size, so that they relatively accurately define the point of fracture during the removal of the ring 10 from the starting platform 13. Without the pedestals 18, the porous structure of the ring 10 would be too fragile to break exactly along the lower surface anchored to the starting platform 13.

Moreover, by keeping the portion 17 separate from the starting platform 13, the powder between the portion 17 and the starting platform 13 dissipates the heat and prevents undesirable stress from occurring, which would be present in the ring 10 if it was directly in contact with the starting platform 13, due to the different thermal expansion ratios during the cooling process.

Considering the high level of precision in obtaining the final dimensions of the ring 10, the filter 4 undergoes an extremely small number of additional processes once the ring 10 has been formed. In any case, the parts that are obtained can easily be machined using Widia tools.

The parameters of the three-dimensional model and the melting parameters can be altered to adjust the thickness of the "filament" and thus change the weight of the filter 4 and porosity to meet the specific requirements of the particular application.

Moreover, most of the powder that has not undergone the melting process can be recovered and re-used for subsequent productions, with consequent cost savings. If the process is performed in a vacuum, there is no oxidation of the powder.

The pre-heating step reduces production times, in that in the following melting step the powders are heated starting from a higher temperature; it also means that the powder of the layer that has been applied can be compacted, thus preventing the powder from rising when hit by the electrons during the following melting step. Moreover, if the forming process is performed without a suitable pre-heating step it may lead to cracking on the finished components.

The cooling step at the end of the forming process makes it possible to cut production times.

As regards the alternative embodiment of FIG. 6, the elimination of separate drive pins and their incorporation into the ring 100 simplifies the filter 4 and reduces production costs and times in connection with the production of anchor systems for use with normal drive pins.

The materials that have been chosen ensure a high level of efficiency, not only in terms of their mechanical strength properties and light weight, also in view of the high specific resistance values mentioned above, but also in terms of the filtering capacity of the separator 1.

As regards the overall weight, the retainer in which the rings 10 are arranged can be made lighter, with respect to the known rotary separators, thanks to the greater strength of the metal foam of the rings 10 and the possibility of eliminating gaps between said rings.

Lastly, it is clear that modifications and variations may be made to the process described and illustrated herein without departing from the scope of the present invention, as set forth in the claims.

In particular, the machines, melting parameters and/or three-dimensional mathematical models could differ from those described by way of example, in order to optimize the weight and filtering properties of the metal foam. In particular, it is not strictly necessary for the porous structure to be determined by repeating a module in exactly the same way, but the three-dimensional model could comprise a cell structure consisting of cells the dimensions and/or shape of which are modulated in the volume defined by said model, for example to optimize filtering in certain areas of the rotor, while maintaining the perfect balance of said rotor.

Moreover, the filter could comprise porous filtering portions, the shape and/or dimensions of which may differ from those illustrated by way of example, and/or it could be used in fields other than aeronautics, for example in rotary separators in industrial plants or turbines for marine engines and electric generators.

Moreover, materials other than titanium alloys could be used. In particular, in applications where there are no specific requirements for lightness and/or high rotor speeds, for example for filters in industrial plants, more economical materials, such as stainless steel powder, could be used.

What is claimed is:

1. Process for producing a filter; the process comprising the steps of:
   a) forming a three-dimensional mathematical model, which comprises a cell structure defining a filtering porous portion of said filter and has cells corresponding to respective pores to be obtained in said porous portion;
   b) applying powder having the same composition as said porous portion and having a grain size lower than a porosity to be obtained, in order to define a horizontal layer of powder having a substantially constant thickness;
   c) locally melting the powder of said layer by means of energy beam scanning in order to form a section of said porous portion according to a level of said three-dimensional model;
   d) lowering the upper surface of the formed section to a predefined position;
   e) repeating the steps from b) to d) until all the sections of said porous portion have been formed;
   f) eliminating the residual powder from the pores of the formed porous portion;
   wherein the process comprises the further step of forming at least one reinforcing ring together with said porous portion, by repeating the steps from b) to d) for a given number of times; said reinforcing ring being defined in said three-dimensional model, and being made from a solid and non-porous material integral with said porous portion and arranged along an edge of said porous portion.

2. Process according to claim 1, wherein the cell structure of said three-dimensional model is formed by defining a basic module and repeating said basic module in exactly the same way until obtaining the shape and the dimensions that correspond, in said three-dimensional model, to those of said porous portion.

3. Process according to claim 1, wherein the melting step is performed by means of an electron beam.

4. Process according to claim 3, further comprising a step of pre-heating the powder of each layer that is applied, to a given temperature below that at which said powder is melted.

5. Process according to claim 4, wherein the pre-heating step comprises a heating of said layer of powder by means of scanning by said electron beam, and in that the temperature reached by said layer of powder in the pre-heating step is adjusted by setting a number of passes of said scanning electron beam.

6. Process according to claim 1, further comprising a cooling step using inert gas before removing said porous portion from a melting chamber in which said porous portion was formed.

7. Process according to claim 1, wherein the melting step is performed while maintaining a vacuum in a melting chamber in which said porous portion is formed.

8. Process according to claim 1, further comprising the additional steps of:
   forming at least one anchoring portion on a starting platform repeating the steps from b) to d) for a given number of times, before forming the sections of said porous portion; said anchoring portion also being defined in said three-dimensional model;
   separating the porous portion formed by said starting platform in correspondence with said anchoring portion.

9. Process according to claim 8, wherein said anchoring portion is defined, in said three-dimensional model, by the same cell structure as said porous portion.

10. Process according to claim 8, wherein said anchoring portion comprises a plurality of pedestals all having the same height and horizontally spaced in relation to one another.

11. Process according to claim 1, wherein the powder has a grain size ranging from between 45 and 65 μm.

12. Process according to claim 1, wherein said cell structure and/or at least one melting parameter is/are set so as to obtain a porous portion having an average pore diameter of between 500 μm and 1500 μm.

13. Process according to claim 1, wherein the step of eliminating the residual powder is performed by means of a sandblasting process using sand having the same composition and grain size as said residual powder.

14. Process according to claim 1, wherein said powder is made from a titanium alloy.

15. Process according to claim 1, wherein a plurality of drive portions made from a solid material and protruding from said porous portion are formed, by repeating the steps from b) to d) for a given number of times; said drive portions also being defined in said three-dimensional model.

16. Filter, wherein it is produced according to the process of claim 1.

17. Process according to claim 1, wherein the step of forming at least one reinforced ring comprises forming two reinforcing rings together with said porous portion, by repeating the steps from b) to d) for a given number of times; said reinforcing rings being defined in said three-dimensional model, and being made from a solid and non-porous material integral with said porous portion and arranged along respective edges of said porous portion.

18. Process according to claim 1, further comprising storing the mathematical model in a control unit.

19. Process according to claim 1, wherein a size of the pores is larger than a grain size of the powder.

* * * * *